Oct. 3, 1972 P. E. HIGHFIELD ET AL 3,695,969

PLASTICS WEB SLITTING AND SEALING

Filed Aug. 20, 1970

INVENTORS
PETER EDWARD HIGHFIELD
GORDON JOHN HILL
BY Cushman, Darby & Cushman
ATTORNEYS

United States Patent Office 3,695,969
Patented Oct. 3, 1972

3,695,969

PLASTICS WEB SLITTING AND SEALING

Peter Edward Highfield and Gordon John Hill, Stevenage, England, assignors to British Visqueen Limited, London, England Filed Aug. 20, 1970, Ser. No. 65,585
Claims priority, application Great Britain, Sept. 8, 1969, 44,342/69
Int. Cl. B32b *31/00;* B29c *17/00*
U.S. Cl. 156—251 9 Claims

ABSTRACT OF THE DISCLOSURE

A method and device for slitting a plastics web by advancing it continuously past a hot knife intersecting its path, to slit the web and form a bead seal along the slit edges, in which a current of air is passed continuously through the slit in the web, in the vicinity of the knife, to prevent or reduce build up of deposits on the knife.

Figure 1:
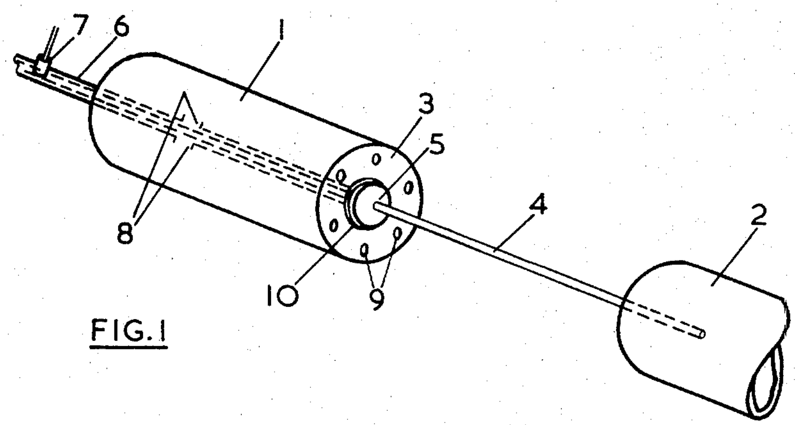

This invention relates to a method and device for slitting plastics webs. More particularly, it relates to a method and device for slitting and bead sealing plastics webs by means of a hot knife.

The method of slitting by means of a hot knife is frequently applied to plastics films and fibrous webs, especially for slitting webs comprising two or more layers of plastics film, and simultaneously sealing together the cut edges of adjacent layers, and for slitting woven or non-woven plastics fabrics to prevent the cut edges from ravelling or fraying; it may similarly be used for slitting fabrics woven from plastics tapes. The method may also be used for slitting webs of a single layer of plastics film, when it provides a strengthening bead seal along the cut edge.

The method may be operated continuously, for slitting a web longitudinally, by passing the web round a rotatable, circumferentially slotted roller, and cutting it by means of a hot knife projecting into the (or each) slot. This method may generally be operated very satisfactorily, but in continuous use it is sometimes found that decomposition products, believed to result mainly from the decomposition by heat of volatile additives in the plastics material, are deposited on the knife and build up to form a hard crust. This crust not only hinders the transfer of heat to the web, but also eventually results in the fouling of the bead seal. The knife must therefore by frequently cleaned, which may require shut-downs of the process which would otherwise be unnecessary. The problem is encountered particularly with polymers having a high additive content.

We have now found that such depositions may be prevented or greatly reduced by passing a current of air through the slit in the web in the vicinity of the knife, between the outside atmosphere and the interior of the slot.

In accordance with the present invention, therefore, a method of slitting a plastics web by advancing the web continuously past a hot knife intersecting its path, the knife being sufficiently hot to melt and slit the web and to form a bead seal along the slit edges thereof, is characterized in that a current of air or other gas substantially inert to the plastics web is passed through the slit in the web, in the vicinity of the knife.

In a preferred form of the method of the invention, the web is passed in an arc past a hot knife intersecting the arc; with this arrangement a knife constructed as a resistance heating element may be used very conveniently, in a manner that will be described hereinafter. For example, the web may be passed round a part of the circumference of a circumferentially slotted rotatable roller, and slit on rotation of the roller by means of a hot knife projecting into the slot, and a current of air or other gas may be passed continuously through the slit in the web, in the vicinity of the knife, between the interior of the slot and the surrounding atmosphere.

In accordance with a further feature of the invention therefore, a device for slitting a plastics web and comprising a circumferentially slotted rotatable roller, means for passing the web round a part of the circumference of the roller for continuous advancement therewith, a knife projecting into a slot in the roller, and means of heating the knife, is characterized in that it includes means for passing a gas current, usually air, through the slot in the roller, in the vicinity of the knife.

The current of air may be supplied either by passing air currents out from inside the slot, generally from the interior of the roller and out through the slot and through the slit in the web; or it may be supplied by withdrawing air from the interior of the slot, to draw air through the slot, and through the slit in the web, from the surrounding atmosphere. The former method is often preferred, since the film before slitting then provides some protection against cooling of the knife by the air or other gas.

Figure 2:
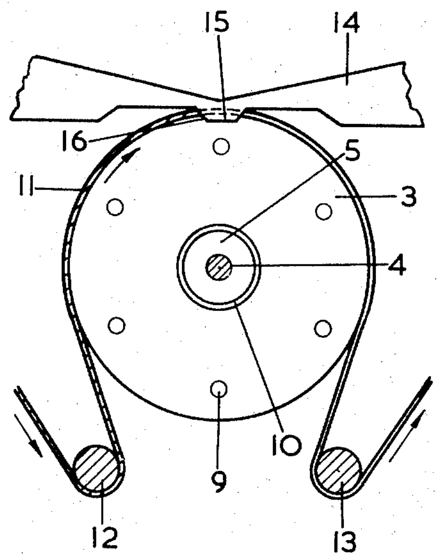

One preferred form of the invention will now be described by way of example with reference to the accompanying drawings, of which:

FIG. 1 is a diagrammatic perspective view of a slotted roller suitable for use in the preferred method of the invention, shown with one roller unit partly withdrawn; and FIG. 2 is a vertical section of the roller through one side of the slot, shown with the slitting blade and plastics web in position.

In FIG. 1: 1 and 2 are two separate halves of the roller, each being hollow and closed by end plates, as at 3, each being freely rotatable about the shaft 4, and the two halves being separated from one another on the shaft by a spacer 5, thus providing a slot in the complete roller. Surrounding one end of the shaft 4 is a hollow shaft 6 extending along the whole length of roller half 1; this shaft is provided at 7 with an air inlet and apertures 8 connect the bore of the shaft with the cavity in the roller half 1. Apertures through the end plate 3 from the cavity in the roller half 1 are provided at 9. Thus, when the roller half 2 is in position against the spacer 5 air may be blown into the slot between them through the apertures 9. The end plates of roller half 1 rotate freely upon the hollow shaft 6 through shielded bearings, indicated at 10. The end plates of roller half 2 are rotatably mounted, through bearings, directly upon shaft 4.

In FIG. 2, are shown end plate 3 of roller half 1 of FIG. 1, with apertures 9, the roller shaft 4, hollow shaft 5, and shielded bearings 10. 11 is the plastics web which passes round the idler roller 12, round more than half of the circumference of the slitting roller and is taken off to pass round idler roller 13 and then to a draw roller. The web itself thus drives the slitting roller. Idler roller 13 is also a dancer roller to maintain a constant tension in the web. 14 is the slitting blade which is suitably a resistance heating element formed from a strip of high resistance alloy and having a heated projection 15 projecting into the slot of the slitting roller and meeting the advancing film with a bevelled edge 16.

In operation of the method, the plastics web is wound from a supply reel round the rollers in the manner described, and thence to draw rolls of a similar take-off device. The heated blade is then brought into position and air is supplied at the required rate through the inlet 7. The web is locally melted and slit immediately it comes into contact with the edge 16 of the hot blade; the edges shrink from the blade and a bead seal is formed along each slit edge. For a given working temperature of the blade the size of the bead depends largely upon the thickness of the blade; a blade is therefore selected of such thickness that it provides, at the chosen working temperature, a bead of the desired size. The working temperature is chosen to provide instant local melting and separation of the web on contact with the blade without excessive heating of the surrounding area by radiation. During slitting the flow of air through the slot in the roller and the slit in the film, in the vicinity of the blade, removes volatile products that would otherwise form a deposit on the blade. A gentle flow of air is sufficient for this purpose. After slitting, the separated strips of the web pass to the draw rolls and thence to a wind up or to a further processing operation.

Various modifications may be made in the method and apparatus particularly described. For example, as indicated hereinbefore, instead of an air current being passed from the interior of the roller to the outside atmosphere, a vacuum pump may be connected at 7 to the shaft 6, and air thus withdrawn from the interior of the roller so that air currents pass inwards through the slit in the film and the slot in the roller in the vicinity of the knife. If desired, a stationary baffle may be positioned within the roller to close or partially close the slot of the rotating roller, except in the vicinity of the slitting blade. Both parts of the roller may be provided with an apertured end plate and with means for supplying or withdrawing air through the apertures. It will be appreciated, moreover, that the slitting roller may be constructed with more than two roller sections, providing two or more slots with means for supplying air to, or withdrawing it from, one or both sides of each slot.

Preferably, the slitting knife is a blade heated by resistance heating as described. A construction of such a blade preferred over that shown in the drawing is described in our copending application No. 44341/69; this describes a heat sealing device for simultaneously slitting a continuously advancing plastics web and sealing the slit edges, and comprising a resistance heating element in the form of a substantially flat blade provided with a projecting edge portion so shaped that it may, with its leading edge, intersect the path of the advancing web when the blade is held perpendicular thereto and with its flat faces parallel with the direction of travel of the web, characterized in that the blade reaches its smallest cross-sectional area in advance of the apex of the projection, in relation to the travelling web, preferably substantially at a point at which the projection may intersect the path of the web. This arrangement provides for the hottest part of the blade to be substantially at the point of its intersection with the web and facing the oncoming film; it thus allows the heat to be used more economically. Moreover, such a blade may be used with a further particular advantage in the method of the present invention, since, when the air currents pass from within the roller as particularly described, the hottest part of the blade is at least partially shielded by the unslit film from the air currents which pass through the slit subsequently formed in the film.

It is also preferred that the slitting knife, instead of being of the shape shown in the drawings, be shaped as described in our copending application No. 44343/69. That application describes a heat sealing device for simultaneously slitting a continuously advancing plastics web and sealing the slit edges and comprising a pair of conductors between which is attached by its opposite ends, under longitudinal tension, a resistance heating element in the form of a substantially flat, elongated blade provided on one of its longer sides with a projecting edge portion so shaped that it may, with its leading edge, intersect the path of the advancing web when the blade is held perpendicular thereto and with its flat faces parallel with the direction of travel of the web, the blade being cut away behind the projection so as to have its smallest cross-sectional area in the vicinity of the projection, characterized in that the contour of the blade and the position of its attachment to the conductors are such that the neutral line of tension lies wholly within the body of the blade.

By the term "neutral line of tension" is meant the line through the ends of the blade about which the strains resulting from the attachment of the blade at its two ends, under longitudinal tension, are balanced. Such a slitting device is found to provide a particularly uniform edge bead seal along the slit edges. The knife used in the method of the present invention may, however, be of any shape, provided that it is capable of clearly dividing the web at the temperature of operation.

As already indicated, one advantage of the method and device of the invention is that the hot knife may be at least partially shielded by the unslit web from the air currents passing through the slit after it has been formed; excessive cooling of the knife is thus avoided. The amount of air supplied to or withdrawn from the system may easily be adjusted to provide an amount found to be just sufficient to clear the vapour from the blade area without excessively cooling the blade.

It has been found that the use of the air currents greatly reduces or even eliminates the deposition of decomposition products on the slitting knife. Since the problem is greatest in plastics webs with a high additive content, the method of the invention is used with particular advantage in the slitting of webs of low grade plastics material, such as low grade film of the type used for the manufacture of garbage bin liners. Low grade film is often manufactured from polymer containing a high proportion of reprocessed scrap; the final product has thus generally received successive additions of antioxidants, often contains a filler to produce a uniform appearance and mask defects in the film, and often contains various slip agents and other additives. The use of the method of the invention greatly facilitates, for example, the high speed production of bags from such film in tubular form, by continuously slitting and sealing the flattened tubular web down the middle of its length, so that the two webs so produced may subsequently be transversely sealed simultaneously at intervals of one bag length, and transversely cut next to the seals, to provide open-mouth bags simultaneously from each web.

A further advantage obtained from the use of the method of the invention for edge sealing slit films together is that the bead seal is chilled almost instantaneously as it is formed, and it is found that the transverse strength of the film in the immediate vicinity of the seals is improved, compared with methods in which the seals are allowed to cool slowly.

We claim:

1. In the method of slitting a plastic web in which the web is passed around a part of the circumference of a circumferentially slotted rotatable roller, and is slit on rotation of the roller by means of a hot knife projecting into the slot, the knife being sufficiently hot to melt and slit the web and to form a bead seal along the slit edges thereof, the improvement consisting in that a current of gas is passed continuously through the slit in the web, past the knife, from the interior of the slot into the atmosphere surrounding the roller.

2. A method as claimed in claim 1 in which the gas is air.

3. A method as claimed in claim 1 in which the gas is passed through the slot from the interior of the roller.

4. A device for slitting a plastics web by a method as claimed in claim 4, and comprising a circumferentially slotted rotatable roller, means for passing the web round a part of the circumference of the roller for continuous advancement therewith, a knife projecting into a slot in the roller, and means of heating the knife, characterized in that it includes means for passing a gas current from the interior of the slot and past the knife.

5. A device as claimed in claim 4 in which the means for passing the gas current through the slot in the roller comprises a cavity within the roller, means for supplying a gas thereto, and apertures in the wall of the slot connecting the slot to the cavity within the roller.

6. A device as claimed in claim 4 in which the knife is a resistance heating element in the form of a substantially flat, elongated blade attached at its ends to a pair of conductors and provided with a projecting edge portion so shaped that it may project into the slot while the blade is held at right angles to and perpendicular to the axis of rotation of the roller, the blade being contoured so as to have its smallest cross-sectional area in the vicinity of the apex of the projection.

7. A device as claimed in claim 6 in which the blade has its smallest cross-sectional area in advance of the apex of the projection, in relation to the travelling web.

8. A device as claimed in claim 7 in which the blade has its smallest cross-sectional area at a point at which the projection may intersect the path of the web.

9. A device as claimed in claim 6 in which the contour of the blade and the position of its attachment to the conductors are such that the neutral line of tension lies wholly within the body of the blade.

References Cited

UNITED STATES PATENTS

| | | | |
|---|---|---|---|
| 3,368,930 | 2/1968 | Beason | 156—251 |
| 3,015,600 | 1/1962 | Cook | 156—515 |

DOUGLAS J. DRUMMOND, Primary Examiner

U.S. Cl. X.R.

156—285, 497, 515